Oct. 16, 1951  O. J. WEIST  2,571,637
AUTOMATIC POULTRY FEEDER
Filed March 29, 1948  2 SHEETS—SHEET 2
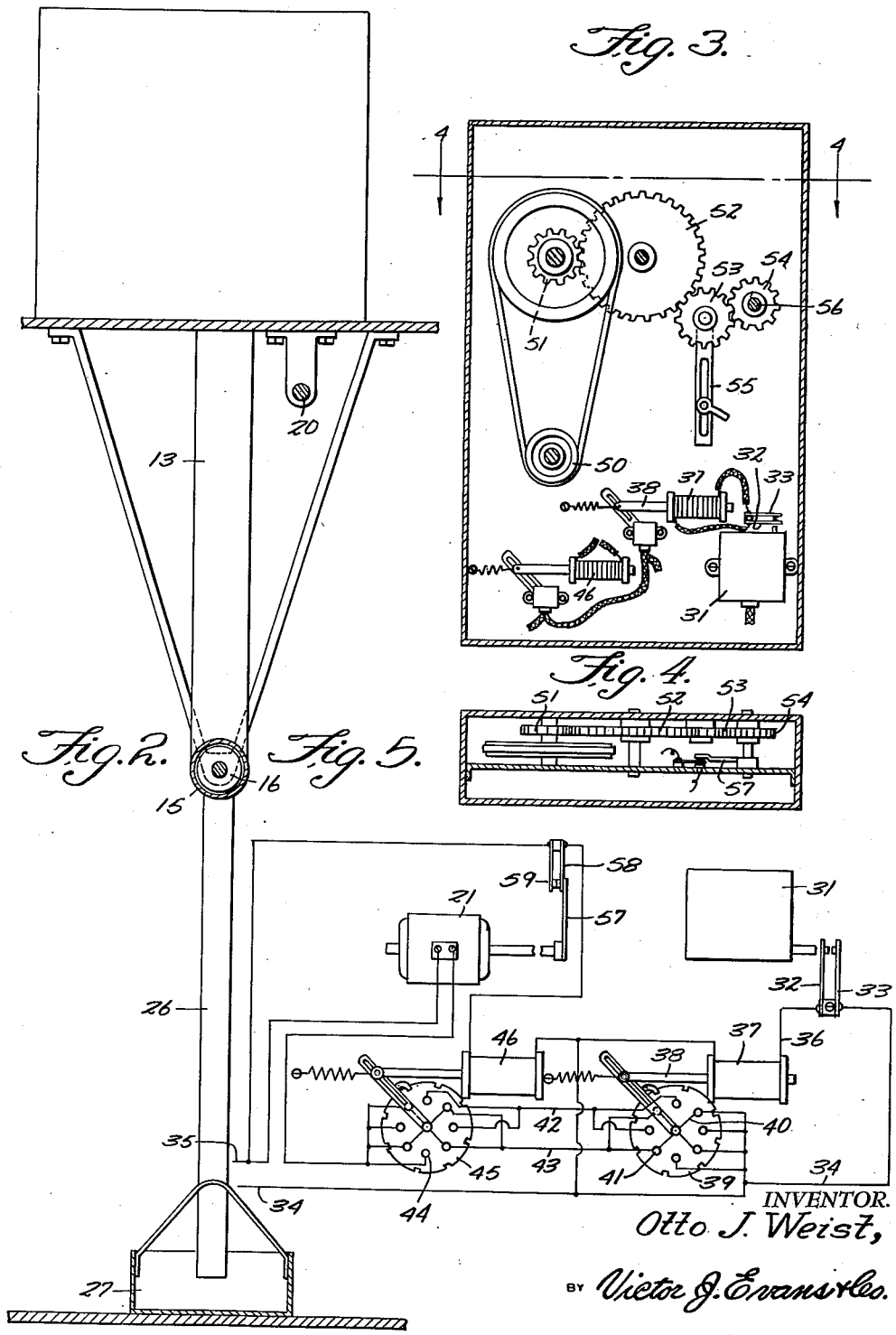
INVENTOR.
Otto J. Weist,
BY Victor J. Evans & Co.
ATTORNEYS Patented Oct. 16, 1951

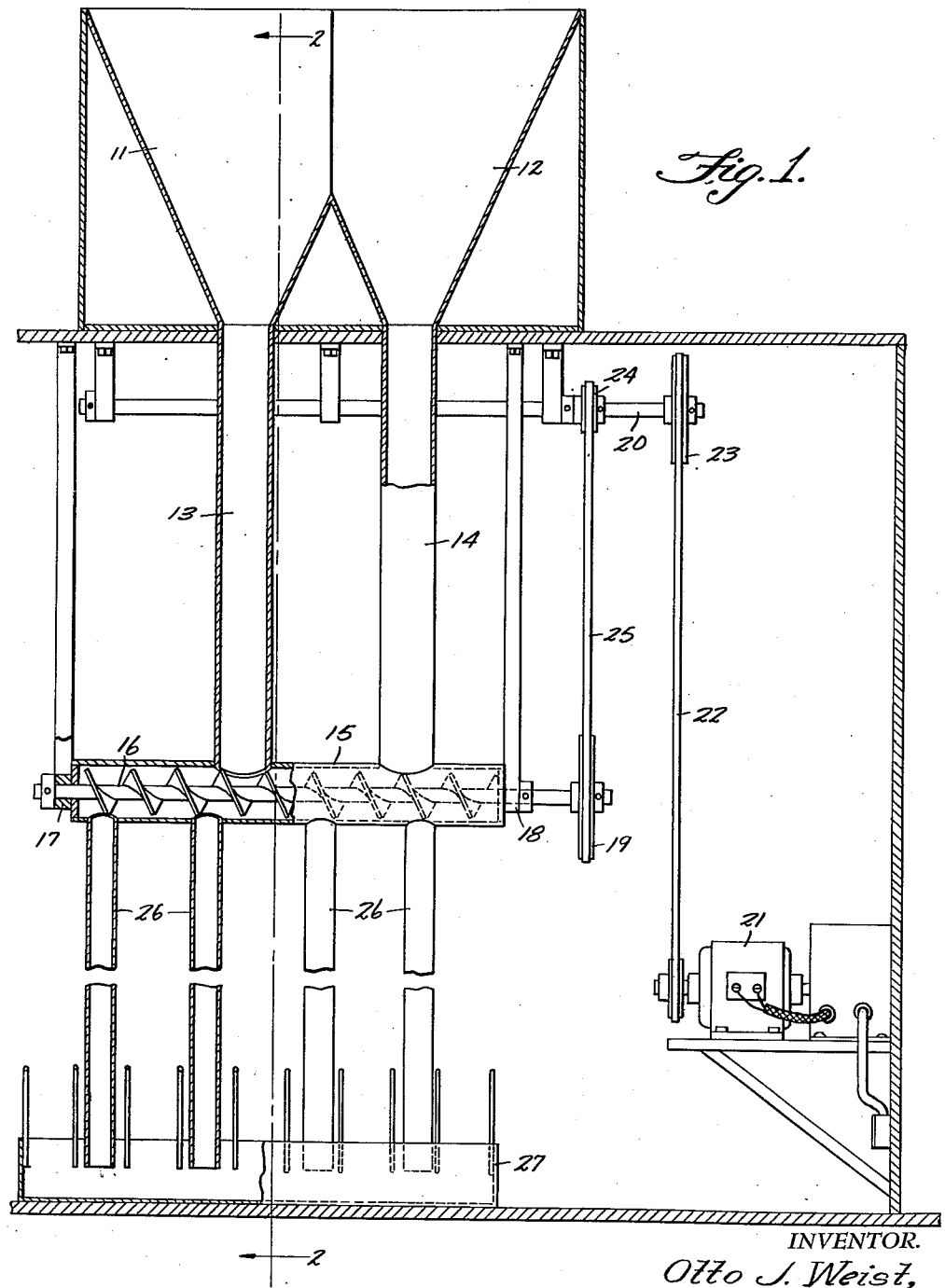

2,571,637

UNITED STATES PATENT OFFICE 2,571,637

AUTOMATIC POULTRY FEEDER

Otto J. Weist, Lodi, Calif.

Application March 29, 1948, Serial No. 17,731

1 Claim. (Cl. 198—64)

This invention relates to poultry feeders and more particularly to feeding apparatus which dispenses the feed periodically in accordance with and under the control of a timing mechanism.

An object of the invention is to provide a feeding device suitable for dispensing feed to poultry or livestock and which will operate in accordance with a predetermined time schedule under the control of a timing device such as a clockwork driven electrical switch.

A further object of the invention is to provide a feeding device of this character in which the amount of feed to be dispensed at each interval can be controlled, independently of the feeding schedule established by the timing device.

For other objects and for a better understanding of the invention, reference may be had to the following detailed description taken in connection with the accompanying drawing, in which Fig. 1 is an elevational view of an embodiment of the invention, partly broken away.

Fig. 2 is a sectional view taken along line 2—2 of Fig. 1, looking in the direction of the arrows.

Fig. 3 is a sectional view through the control mechanism of the feeder.

Fig. 4 is a sectional plan view taken along the line 4—4 of Fig. 3 looking in the direction of the arrows.

Fig. 5 is a circuit diagram illustrating the connections used for operation of the feeding device.

Referring to Figure 1, the invention is shown arranged for use in a barn or similar building where the poultry or animals are to be fed. Disposed on an upper floor of the structure are a pair of feed or supply bins 11 and 12 of the usual tapered construction communicating at their lower ends with the vertical feed pipes 13 and 14 respectively. At their lower ends, feed pipes 13 and 14 communicate with a horizontal cylinder 15. Extending longitudinally within cylinder 15 is a worm 16 which is freely rotatable in journals 17 and 18 and is provided at one end with a driving pulley 19. Pulley 19 is connected by a belt 25 to a speed reducing pulley 24 mounted on an idler shaft 20 which is driven by motor 21 through a further belt 22. Belt 22 drives another speed reducing pulley 23 carried by idler shaft 20. It will be noted that belts 22 and 25 together with the pulleys 19, 24 and 23 cause the worm 16 to rotate at a speed less than that of motor 21.

Extending downwardly from horizontal cylinder 15 are a plurality of feed dispensing tubes 26, their lower ends being in communication with a feed trough 27. It will be noted that feed dispensing tubes 26 are laterally displaced with respect to the feed pipes 13 and 14, so that feed cannot fall directly from the feed bins 11 and 12 through horizontal tube 15 to the dispensing tubes 26. This prevents any direct gravitational action from causing feed to be dispensed except during rotation of worm 16. The use of the worm 16 also serves to distribute the feed to a larger number of tubes such as the tubes 26.

The rotation of worm 16 for the periodic dispensing of feed is controlled by a timing device designated 31 which may be of any desired type. Timing device 31, in accordance with a pre-determined schedule, causes momentary closure of a pair of contacts 32—33 at each time during the day when feed is to be dispensed. The duration of contact closure of contacts 32—33 is sufficiently short so that these contacts will always remain in the open position by the time the feed dispensing operation of worm 16 has been completed. Upon closure of contacts of 32—33, a circuit is established from power supply conductors 34—35 and conductor 36 to energize a solenoid 37. In the event that solenoid 37 is not suitable for continuous duty, the usual provision may be made for reducing the holding current to a safe value or for causing it to become either wholly or partially de-energized after it has completed its stroke. As previously noted, however, it is contemplated that timing device 31 will cause closure of contacts 32—33 for a comparatively short interval, in any event less than the duration of the feed dispensing interval. Should the timing mechanism be of such a character that this condition will not prevail, then the use of any one of the many known arrangements for causing prior de-energization of solenoid 37 will be required. Energization of solenoid 37 draws plunger 38 inwardly toward the right causing rotation of a notched disk 39 through the distance between adjacent notches. This rotation causes a contact member 40 carried by disk 39 to advance in a clockwise position establishing a circuit between the next pair of a plurality of diametrically opposed stationary contacts 41. It will be noted that eight such contacts 41 are shown, and that an adjacent group of four of these contacts are connected together and to conductor 34. The opposite contacts are alternately connected to conductors 42 and 43. A similar pair of diametrically opposed stationary contacts 44 is operatively associated with another notched disk 45. Notched disk 45 is advanced a distance of one notch upon energization of solenoid 46, the operation being similar to that in the case of solenoid 37.

It will thus be seen that each time solenoid 37 is energized, a circuit is established either to conductor 42 or to conductor 43. Depending upon the relative positions of the two notched disks 39 and 45, a circuit will be made or interrupted from conductor 34 through either conductor 42 or 43 and conductors 46 to the motor 21.

Motor 21 also drives an enclosed pulley 50 which in turn drives a reducing gear train 51, 52, 53 and 54. Gear 53 is shown mounted on an adjustable support 55 so that it may be replaced by gears of various diameters as desired in order to vary the amount of gear reduction obtained. Gear 54 is carried by shaft 56 which also carries an arm 57 which periodically causes closure, once each revolution, of a pair of contacts 58—59.

In operation, at the appointed hour for the feeding of the poultry or livestock, timing device 31 causes momentary closure of contacts 32—33. This energizes solenoid 37. Energization of solenoid 37 causes notched disk 39 to advance one notch establishing a circuit through either conductor 42 or conductor 43 as the case may be, to energize motor 21 through conductor 46. Motor 21 operates causing rotation of worm 16 which dispenses the feed. Simultaneously with operation of motor 21, arm 57 starts a revolution, the time required to complete this revolution being determined by the number of teeth particular gear used for gear 53 and by other dimentional characteristics of the speed reducing gear system. At the completion of one revolution of shaft 56, contacts 58—59 close and are almost immediately opened by the coating of the motor 21. Momentary closure of contacts 58—59 establishes an energizing circuit for solenoid 46 which advances notched disk 45 one notch, thereby de-energizing motor 21. The circuit will be re-established upon the next advance of notched disk 39 and will again be interrupted upon the further advance of notched disk 45.

It will be seen that a predetermined amount of feed may be dispensed by properly selecting the number of teeth in gear 53 to control the length of time during which motor 21 will operate. The number of feedings in any period may be determined by the selection of a suitable timing program for the timing device 31.

While various changes may be made in the detail construction, it shall be understood that such changes shall be within the spirit and scope of the present invention as defined by the appended claim.

I claim:

In a material distributor, the combination which comprises a horizontally disposed conveyor, an elongated trough positioned below the conveyor, a plurality of spaced tubes extended from the conveyor to the trough and positioned to carry materials by gravity from the conveyor to the trough, a plurality of supply bins positioned above the conveyor, and spaced vertically disposed pipes extended from the supply bins to the conveyor whereby the conveyor is supplied with material at a plurality of points throughout the length thereof to provide equal distribution of material throughout the length of the trough, said pipes from the supply bin to the conveyor being offset in relation to the tubes extended from the conveyor to the trough.

OTTO J. WEIST.

REFERENCES CITED

The following references are of record in the file of this patent:

UNITED STATES PATENTS

| Number | Name | Date |
|---|---|---|
| 1,013,707 | Watson | Jan. 2, 1912 |
| 1,237,334 | Heisler | Aug. 21, 1917 |
| 1,392,311 | Egeland | Oct. 4, 1921 |